July 11, 1950 — E. CIPRIANO — 2,515,032
INTERMITTENT GRIP WITH LEVER ACTUATOR
Filed Jan. 11, 1946 — 2 Sheets-Sheet 1

INVENTOR.
Enrico Cipriano
BY Max Schwartz
Attorney

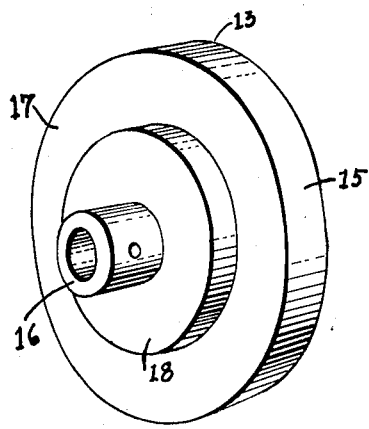
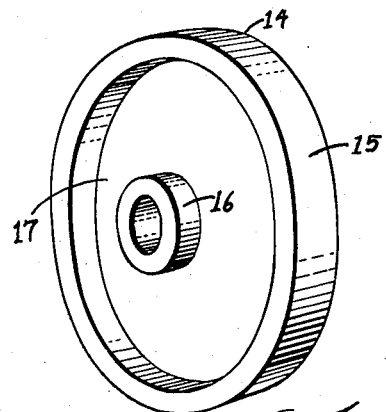
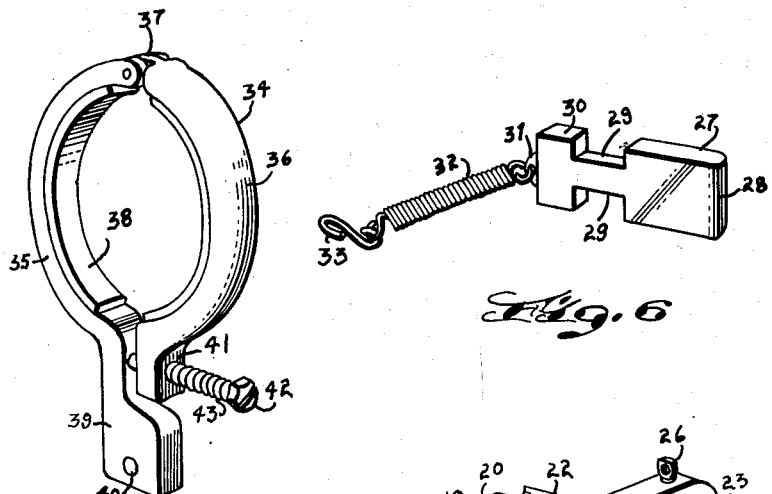

Patented July 11, 1950

2,515,032

UNITED STATES PATENT OFFICE 2,515,032

INTERMITTENT GRIP WITH LEVER ACTUATOR

Enrico Cipriano, Johnston, R. I., assignor to Roll-Feeds Corporation, Pawtucket, R. I., a corporation of Rhode Island Application January 11, 1946, Serial No. 640,653

1 Claim. (Cl. 74—142)

My present invention relates to feeding attachments, and more particularly to a novel construction of friction feed for a power press or similar machine.

The principal object of the present invention is to provide a friction feed which is highly accurate and dependable to close tolerances.

Another object of the present invention is to provide a friction type feed which is insured against slipping.

A further object of the present invention is to provide a friction feed which can be reversed without dismounting or dismantling the feed.

Another object of the present invention is to provide a friction feed having a minimum number of readily accessible parts for adjustment or repairs.

A further object of the present invention is to provide a friction feed which is simple in construction and easy and economical to manufacture and assemble.

With the above and other objects and advantageous features in view, my invention consists of a novel arrangement of parts, more fully disclosed in the detailed description following, in conjunction with the accompanying drawings, and more fully defined in the appended claim.

In the drawings—

Fig. 3 is a perspective view of one of the friction wheels, showing the outside;

Fig. 4 is a similar view showing the inside;

Fig. 5 is a perspective view of the brake;

Fig. 6 is a perspective view of the gripping member; and

Fig. 7 is a perspective view of the rocker arm.

To feed metal in strip form under the hammer of a power press or similar machine, the metal strip is passed between a pair of rollers, one of which is intermittently driven to either push or pull the metal strip at each upward movement of the hammer. The conventional driving method is a ratchet wheel. However, it has been found that greater accuracy is required for close tolerances, and various friction type feeds have been devised. This type of feed can more readily be adjusted for accuracy but is subject to wear and slippage. Furthermore, when it is necessary to reverse the feed for different kinds of work, is must be dismantled, turned around, and reassembled.

The friction feed of the present invention is designed to overcome the above disadvantages. It provides four frictional contact points to prevent slipping and insure greater accuracy. It is simply and easily reversible without dismantling. And it is composed of a minimum number of readily fabricated and assembled parts.

Figure 1:
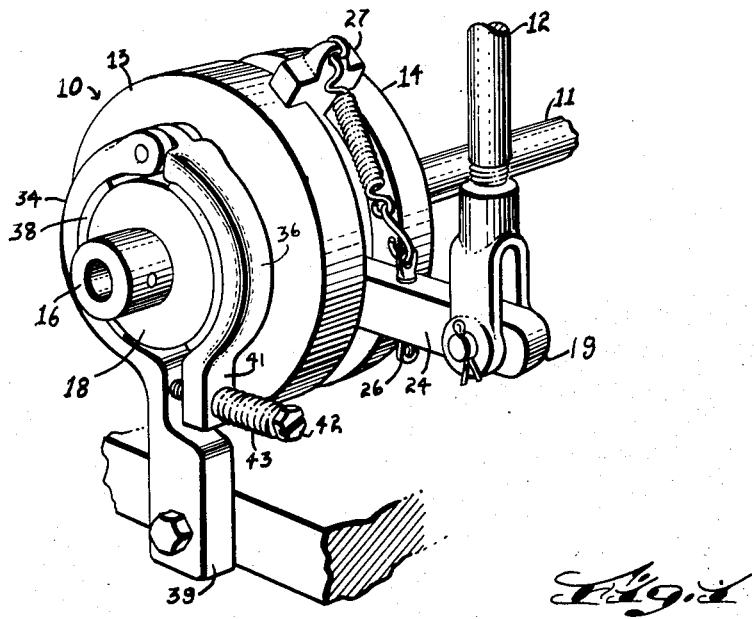
Fig. 1 is a perspective view of a friction feed embodying my invention.

Referring more in detail to the drawings illustrating my invention, the feed 10, Fig. 1, is mounted on and adapted to drive the roller shaft 11, and is in turn operated by the arm 12 which is reciprocally attached to the power press drive (not shown).

The feed 10 comprises a pair of driving wheels 13 and 14, Figs. 3 and 4, which are mounted on and keyed to the shaft 11. The wheels 13 and 14 are identical in size and shape and comprise an outer rim portion 15 connected to a central hub 16 by an integral plate 17 positioned at one side edge of the rim 15 to form the outer sides of the wheels, the inner sides being hollow, Fig. 4. The plate 17 is formed with an integral, laterally extending, smaller wheel portion 18, which provides a braking surface as hereinafter described.

Figure 2:
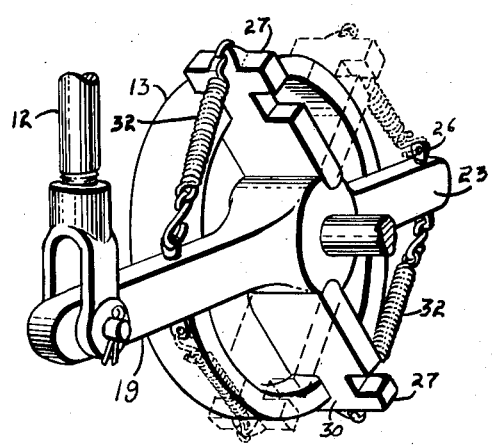
Fig. 2 is a perspective view of the feed with one of the friction wheels removed to show the interior.

The wheels 13 and 14 are mounted on the shaft 11 in spaced relation with the inner hollow sides facing towards each other, Figs. 1 and 2. A rocker arm 19 is rotatably mounted on the shaft 11 between the wheels 13 and 14, the spacing being just enough to permit independent movement of the arm 19, Figs. 1 and 2. The rocker arm 19, Fig. 7, comprises a hub portion 20 having an opening 21 for mounting on the shaft 11, and two concave grooves 22 extending transversely across the arm, one above and one below the opening 21. The rocker arm 19 further comprises a short, integral arm portion 23 which extends forwardly of the hub 20, and a longer arm portion 24 which extends rearwardly and is provided with an opening 25 for pivotal connection with the power drive arm 12. The portions 23 and 24 are provided, both top and bottom, with eyelets 26 positioned equidistant from the hub 20.

The rocker arm 19 drives the wheels 13 and 14 through a pair of driving fingers 27 mounted above and below the arm 19, Fig. 2. Each finger 27 is generally rectangular in shape, has a rounded bottom edge 28, and is cut away at each side, as at 29, to form a T-shaped portion 30 with sharp corners. The top is provided with an integral tab 31 to which a coil spring 32 is loosely hooked. The opposite end of the spring 32 is also provided with a hook 33.

Each finger 27 is positioned with the rounded bottom edge 28 resting in the concave groove 22 of the rocker arm 19. The cut away portions 29 are so positioned that, when the fingers 27 are in vertical position, the rims 15 of the wheels 13 and 14 will extend into the cuts, the T-shaped top portions 30 extending over the outer surface of each wheel. However, as shown in Fig. 2, the upper finger is inclined rearwardly at a tangent to the hub 20 of the rocker arm 19 until one edge of the T-shaped portion 30 rests on the outer surface of the rims 15 of the wheels 13 and 14. The finger 27 is retained in this position by the spring 32, the hook 33 being attached to the upper rear eyelet 26 on the rocker arm. The lower finger is similarly inclined parallel to the upper finger, the lower spring 32 being hooked to the lower forward eyelet 26 on the rocker arm.

With the parts assembled as hereinabove described, a brake 34 is adapted to engage the part 18 of the wheel 13, Fig. 1. (If desired a second brake may be used on the wheel 14.) The brake 34 may be of any conventional design which will permit the wheels 13 and 14 to rotate and drive the shaft 11, but which will prevent any backlash or other movement of the wheels. As illustrated, the brake 34 comprises two semicircular members 35 and 36, Fig. 5, hinged to each other at the top, as at 37. The members 35 and 36 are lined with conventional brake lining 38. The member 35 has an integral depending portion 39 with an opening 40 for bolting the brake to the machine, Fig. 1, against rotation. The member 36 is provided with a shorter depending portion 41, and an adjustment screw 42 extends through the portions 34 and 41 with a coil spring 43 positioned between the screw head and the portion 41 to adjustably urge the parts together to tighten the brake.

In operation, upward movement of the arm 12 will reciprocate the rocker arm and cause the edges of the grooves 22 to press against the rounded bottoms 28 of the fingers 27. Since the springs 32 already retain the fingers in the maximum twisted position with the portions 30 resting on the rims of the wheels 13 and 14, pressure of the rocker arm 19 will cause the fingers to bite onto and frictionally grab the wheel surfaces and rotate the wheels 13 and 14 and shaft 11 with the arm. When the arm 12 descends and moves the rocker arm downwardly, the pressure on the fingers 27 is released and the brake 34 prevents movement of the wheels while the fingers slide back into downward position. It should be noted that the pressure of one finger 27 on one wheel rim is sufficient to operate the feed. By using two wheels and two double fingers, four contact points are provided to insure accuracy and eliminate slipping.

The reversal of the feed is easy and simple. The springs 32 are unhooked and the fingers tilted in the opposite direction, the springs being hooked into the opposite eyelets, as shown in dotted lines in Fig. 2. In reversed position, the feed will drive the wheels on the downward stroke and idle on the upward stroke.

It can thus be readily seen that the applicant's device is simple in construction and easy and economical to manufacture and assemble. The feed is accurate and non-slipping, and can be reversed without dismantling, thus saving costly shutdowns.

While I have described a particular constructional embodiment of my invention, it is obvious that changes may readily be made in the size, shape and relative arrangement of the parts, without departing from the spirit and scope of the invention as defined in the appended claim.

I claim:

A feeding device comprising a shaft, a pair of spaced wheels mounted on and keyed to said shaft, said wheels having integral laterally extending rims extending toward each other, a power driven rocker arm rotatably mounted on said shaft between said wheels, a gripping member mounted on the hub of said rocker arm, said gripping member comprising a rectangular plate having cut-out portions at each side engaging the rims of said wheels, and a coil spring having one end pivotally attached to the top of said gripping member, the other end of said coil spring being releasably connected to said rocker arm at a point spaced from said hub to yieldingly retain said gripping member in a position inclined towards one end of said rocker arm, whereby the edges of the cut-out portions of said gripping member engage the upper and lower surfaces of said wheel rims, said gripping member gripping said wheel rims when said rocker arm is moved in one direction and releasing said wheel rims when said rocker arm is moved in the opposite direction, said spring rocker arm connection being movable to the opposite side of said hub to reverse the inclination of said gripping member whereby the gripping and releasing action is reversed.

ENRICO CIPRIANO.

REFERENCES CITED

The following references are of record in the file of this patent:

UNITED STATES PATENTS

| Number | Name | Date |
|---|---|---|
| 288,879 | Smith | Nov. 20, 1883 |
| 469,201 | Clyne | Feb. 16, 1892 |
| 599,106 | Barlow et al. | Feb. 15, 1898 |
| 1,170,085 | Maurseth | Feb. 1, 1916 |
| 1,235,633 | Anderson | Aug. 7, 1917 |
| 1,266,017 | Hill | May 14, 1918 |
| 1,283,661 | Carlson | Nov. 5, 1918 |
| 1,902,375 | Pitter | Mar. 21, 1933 |
| 2,123,724 | Grisdale | July 12, 1938 |